(12) United States Patent
Johansson (10) Patent No.: US 9,804,624 B2
(45) Date of Patent: Oct. 31, 2017

(54) ELECTRICAL VEHICLE BATTERY CHARGER MOUNTED ON LAMP POST

(71) Applicant: LIROS POWER SOLUTION AB, Malmo (SE)

(72) Inventor: Roland Johansson, Vittsjo (SE)

(73) Assignee: LIROS POWER SOLUTION AB, Malmö (SE)

( * ) Notice: Subject to any disclaimer, the term of this patent is extended or adjusted under 35 U.S.C. 154(b) by 53 days.

(21) Appl. No.: 14/443,522

(22) PCT Filed: Nov. 18, 2013

(86) PCT No.: PCT/SE2013/051347
§ 371 (c)(1),
(2) Date: May 18, 2015

(87) PCT Pub. No.: WO2014/077773
PCT Pub. Date: May 22, 2014

(65) Prior Publication Data
US 2015/0298564 A1    Oct. 22, 2015

(30) Foreign Application Priority Data

Nov. 19, 2012  (SE) ...................................... 1251307
Dec. 18, 2012  (SE) ...................................... 1251451
May 30, 2013  (SE) ...................................... 1350657

(51) Int. Cl.
*H02J 7/00*  (2006.01)
*G05F 1/66*  (2006.01)
(Continued)

(52) U.S. Cl.
CPC ............ *G05F 1/66* (2013.01); *B60L 11/1816* (2013.01); *B60L 11/1825* (2013.01);
(Continued)

(58) Field of Classification Search
CPC .............. B60L 11/1809; B60L 11/1816; B60L 11/1824; B60L 11/1848; B60L 2230/00; H02J 7/0027
(Continued)

(56) References Cited

U.S. PATENT DOCUMENTS 8,315,930 B2  11/2012  Littrell
9,123,035 B2  9/2015  Penilla et al.
(Continued)

FOREIGN PATENT DOCUMENTS

DE    102007038245 A1    3/2009
DE    102009008157 A1    8/2010
(Continued)

OTHER PUBLICATIONS

International Search Report; International application No. PCT/SE2013/051347; dated Mar. 18, 2014.
(Continued)

*Primary Examiner* — Paul Dinh
(74) *Attorney, Agent, or Firm* — Mollborn Patents, Inc.; Fredrik Mollborn (57) ABSTRACT

The present invention relates to an electric distribution appliance (100) suitable for distributing electrical power to a mobile device such as an electric vehicle, said appliance comprising a central part (102), a lower part (104) and an upper part (106), where each of said lower part (104) and said upper part (106) are mounted in such a way that they can be removed from said central part (102), said electric distribution appliance being adapted for being mounted to an existing lamp post (135).

16 Claims, 7 Drawing Sheets

(51) Int. Cl.
  *B60L 11/18* (2006.01)
  *H04L 29/08* (2006.01)
  *H04W 84/04* (2009.01)
  *H04W 84/12* (2009.01)

(52) U.S. Cl.
  CPC ....... *B60L 11/1844* (2013.01); *B60L 11/1846* (2013.01); *B60L 11/1848* (2013.01); *H02J 7/0047* (2013.01); *H04L 67/1002* (2013.01); *H04L 67/12* (2013.01); *B60L 2230/12* (2013.01); *B60L 2230/16* (2013.01); *B60L 2240/70* (2013.01); *B60L 2240/72* (2013.01); *B60L 2250/12* (2013.01); *H02J 2007/0096* (2013.01); *H04W 84/045* (2013.01); *H04W 84/12* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
  USPC ......................................................... 320/109
  See application file for complete search history.

(56) References Cited

U.S. PATENT DOCUMENTS

| | | | |
|---|---|---|---|
| 9,545,853 | B1 | 1/2017 | Penilla et al. |
| 2010/0013436 | A1* | 1/2010 | Lowenthal ............. G06Q 30/04 320/109 |
| 2010/0283426 | A1 | 11/2010 | Redmann |
| 2011/0077809 | A1 | 3/2011 | Leary |
| 2011/0172839 | A1 | 7/2011 | Brown et al. |
| 2011/0246014 | A1 | 10/2011 | Sauper |
| 2013/0179007 | A1 | 7/2013 | Dalum |
| 2013/0268433 | A1* | 10/2013 | Viner ................... G06Q 20/145 705/40 |
| 2014/0039699 | A1 | 2/2014 | Forbes |
| 2014/0152256 | A1 | 6/2014 | Lowenthal et al. |
| 2014/0371936 | A1 | 12/2014 | Kamel et al. |

FOREIGN PATENT DOCUMENTS

| | | |
|---|---|---|
| WO | 2012034225 A1 | 3/2012 |
| WO | 2013034872 A2 | 3/2013 |

OTHER PUBLICATIONS

International Search Report; International application No. PCT/SE2013/051348; dated Mar. 19, 2014.
U.S. Office Action. U.S. Appl. No. 14/443,582. dated May 17, 2017.

* cited by examiner

ELECTRICAL VEHICLE BATTERY CHARGER MOUNTED ON LAMP POST

FIELD OF INVENTION

The present invention relates to the field of distribution of electrical power. More specifically, the invention relates to an electric distribution appliance adapted for being mounted on existing lamp posts along roads and streets, said appliance being intended for distributing power to a movable device such as an electric vehicle. The invention also relates to a system for distributing power comprising a plurality of electric distribution appliances and a master appliance, where said master appliance is adapted for controlling the electric distribution appliances. Finally, the invention provides a method for controlling said system.

TECHNICAL BACKGROUND

There is an increased demand of infrastructure solutions for charging electric vehicles. However, most such solutions aims at setting up new charging stations demanding new connections to the mains. Expamples of such solutions could be found in DE 10 2007 038 245, U.S. Pat. Nos. 5,563,491 and 7,984,852. WO 2011/042322 and US 2011/0213656 both relates to new such charging stations in combination with management of parking spaces. Such systems are expensive and complicated because of the extensive construction work that is required but also because of construction permits required in most countries. Accordingly, there is a need for cheap, simple and flexible solutions regarding infrastructure for electric vehicles.

SUMMARY OF THE INVENTION

The invention solves the above mentioned problems by providing an electric distribution appliance and relating systems and methods in accordance with the appended claims.

Accordingly, the invention provides an electric distribution appliance for distributing electric power to a mobile device such as an electric vehicle, said electric distribution appliance being adapted for being fitted to an existing lamp post, wherein the appliance comprises a central part and one or more additional parts which additional parts are mounted in such a way that they can be removed from said central part while the central part is mounted to a lamp post, and that only said central part is adapted for being fitted to an existing lamp post, said electric distribution appliance comprising an interface section, said central part having a switching means;
a cable connection; and
a controller,
said switching means being connected to said cable connection and being adapted for being connected to an incoming cable in connection with a power supply network and being adapted for being connected to an outgoing cable;
said cable connection being adapted for being connected to a contact module, which in turn is adapted for distributing power to a mobile device;
said interface section being adapted for receiving commands from a user regarding initiation and/or termination of distribution of power into said cable connection, and being set up to forward data corresponding to said commands to said controller;

wherein that said switching means is set up to control distribution of power from said incoming cable into each of said outgoing cable and said cable connection based on control signals from said controller said controller being set up to receive data from said interface section, and being set up to control distribution of power from said incoming cable into each of said outgoing cable and said cable connection based on external control signals, said control signals being determined based on pre-stored data and incoming data such as incoming data from said interface section, a cloud server and/or said mobile device.

As disclosed herein, the term "mobile device" relates to any type of device that is movable and could be powered by a power supply network. Examples of such devices are electric vehicles, such as electric cars, segways, and electric motorcycles, but also other portable machines and portable lighting sets. A further example is a conventional car equipped with an electrically powered engine pre-heater or car heater.

As disclosed herein, the term "existing lamp post" relates to any kind of existing lamp post. Basically, a typical modern lamp post is comprised of a pole anchored to the ground and having an electrically powered lightening means arranged on top as well as cables connecting the lightening means with the mains. Suitable such lightening means are LED (light emitting diode) arrangements or more conventional light bulb or fluorescent tube arrangements. Typically, LED arrangements comprise units for wireless communication and control units in addition to the actual LED units. Accordingly, many LED arrangements could be remotely controlled using wireless means. Preferably, a lamp post comprises a lid or covering that can be removed in order to get access to the electrical cables and fuses of the lamp post. Naturally, it is possible to use a lamp post without such a lid or covering but then it is necessary to cut out a larger hole in the lamp post.

The term "in such a way that they can be removed from the central part" means that the additional parts could be removed by a small number of actions such as adjusting the position of a rail on/in an external surface of the central part, or loosening of at least one fastening element arranged on the outside surfaces of the parts and disconnecting a cable connections. Other examples of such actions could be to present an identification device such as a RFID tag and/or a Bluetooth communication device, to send an SMS or set up a phone call to specific phone number or a combination of some or all of these actions. Accordingly, it is easy to remove and substitute additional parts which increase flexibility of the electric distribution appliance. On the other hand, it is also important that that the electric distribution appliance is robust and vandalism-resistant in order to maximize reliability and minimize maintenance costs. Therefore, it is preferred that the electric distribution appliance does not have any means for opening the whole appliance or parts thereof, operating the appliance and disconnecting additional parts that are accessible from outside when the appliance is in stand-by mode or operation mode. Typically, the appliance is operated by first presenting an identification device such as a RFID tag and/or a Bluetooth communication device, sending an SMS or setting up a phone call to specific phone number or a combination of some or all of these actions in order to expose accessible means on an outer surface of the appliance for e.g. opening the whole appliance or parts thereof, operating the appliance and/or disconnecting additional parts.

As disclosed herein, the term "switching means" relates to an arrangement for switching electrical power from the incoming cable to the cable connection or the outgoing cable, or both of them simultaneously. The switching means is also capable of fine-tuning the distribution of power to both the connection and the outgoing cable. The distribution operations of the switching means are carried out after reception of external control signals. Furthermore, the switching means also distributes power to the rest of the electrical distribution appliance. Arrangements of this type should be well-known to the skilled person.

As disclosed herein, the term "cable connection" relates to a set of cables for distributing electrical power from the switching means to a contact module. In some embodiments the cable connection may also comprise further cables for forwarding control signals between the contact module and controller via the switching means. Such signals typically originate from the mobile device.

As disclosed herein, the term "interface section" relates to a part of the electric distribution appliance that comprises means, typically RFID reading means or a Bluetooth interface, but in some embodiments buttons and keys by which a user may submit instructions to the electric distribution appliance. In some embodiments, the interface section does not have any buttons or keys but only RFID reading means and/or a Bluetooth interface. Typical examples of such instructions are "initiate distribution of power to the cable connection" and interrupt distribution of power to the connection. Typically, a first presentation of an RFID tag may be interpreted as an instruction to initiate distribution of power to the cable connection and a second subsequent presentation may be regarded as an instruction to terminate distribution of power. In some embodiments, the interface section may located in the central part. In some embodiments, when the electric distribution appliance also comprises an upper part, the interface section may be located therein. In some embodiments, the user may submit other instructions and data, such as requested amount of time for distribution of power to the cable connection, and the amount of electrical power to be distributed to the cable connection. In some embodiments, the user may identify himself/herself at the interface section by entering a PIN code. In other embodiments, the user may identify himself/herself, for instance by presenting a credit card, by calling or sending an SMS to a specific phone number from a mobile phone, an RFID tag or an e-wallet where the user is identified by a Bluetooth interface or a combination of such actions. Even when the user identifies himself/herself outside the interface section, in some embodiments, the user initiates and/or terminates distribution of power by submissions using the interface section. The interface section may be arranged in the central part or in an additional part such as an upper part.

As disclosed herein, the term "controller" relates to a micro-computer or a similar device for receiving data, transforming data according to standard routines and sending out data. Typically, the controller may receive data from an interface section which may comprise an RFID reader and/or a Bluetooth interface, payment section, power sensors a connected mobile device and the communication unit. The data is processed according to pre-defined rules and the processed data is typically sent out to at least one member of the group of the switching means, the contact module, the communication unit, the means for displaying visual signals (if present), the interface section, a connected mobile device and the payment section (if present). The skilled person should be able to select a suitable controller.

As disclosed herein, the term "incoming cable" relates to a cable connected to a power supply network. When the electric distribution appliance is used for retrofitting an existing lamp post, the incoming cable is the cable guiding the power up the fuse arrangement of the lamp post. When installing the electric distribution appliance on a lamp post, the incoming cable is connected to one of the connections of the switching means.

As disclosed herein, the term "outgoing cable" relates to a cable connecting the light-producing means, typically an LED (light emitting diode) arrangement, a luminous tube or a bulb, with the switching means. The outgoing cable corresponds to the cable connecting the fuse arrangement of a non-retrofitted lamp post with the light-producing means.

As disclosed herein, the term "control signals" relates to signals from one element that initiates a particular action within a second element. The skilled person is well acquainted with such signals and knows how to adopt elements receiving and transmitting them in order to obtain a desired effect.

As disclosed herein, the term "contact module" relates to an arrangement receiving electric power from the switching means via the cable connection. The contact module then distributes the electrical power further to a mobile device. In some embodiments, the contact module comprises a plug or a socket where a user may connect a cable from a mobile device. In some embodiments, the contact module comprises an interface for receiving data from the mobile device and forwarding said data to the controller. In some embodiments, the contact module comprises a cable arrangement comprising a first cable for distributing electrical power and a second cable for transferring data in both directions. The cable arrangement is connected to the connection in the contact module. In the other end, the cable arrangement ends with a plug or socket that is adapted for being connected to the mobile device.

In some preferred embodiment, the switching means comprises at least one power sensor, said means being set up to forward power data to said controller (112). The term "power sensor" relates to a sensor that continuously or regularly sends data regarding power or data that could be transformed into data regarding power. The skilled person is well aware of such sensors.

In some embodiment, said central part further comprises a payment section, said payment section comprising means for obtaining payment from a customer, said payment section being set up to send data relating to payment to said controller.

As disclosed herein, the term "payment section", relates to a section for receiving payment data. In some embodiments, this section is comprised of a credit card reader, optionally together with one or more input means. The user inserts his/her credit card in the reader and optionally enters a pin code. The payment section then forwards this data to the controller.

In some embodiments, the appliance also comprises a lower additional part, said lower part comprising a contact module adapted for distributing power to a mobile device, said contact module being connected to the cable connection.

In some embodiments, the lower part comprises a closable lid covering the contact module, and where the lid is automatically opened before distribution of power through the contact module is initiated and where the lid is closed when distribution of power has been terminated. In order to protect the lower part from vandalism, there are no outer actuating means for opening the lid.

In some embodiments, the power is distributed to a connection in said contact module and further through cable to a plug/socket adapted for being connected to movable device. In some embodiments there is a connection between the plug/socket enabling data to be transmitted between the mobile device and the controller. As disclosed herein, the terms "plug" or "socket" typically relate to plugs/sockets that are adapted for being connected to corresponding plugs/sockets associated with the mobile device in order to distribute electrical power to the mobile device. In some embodiments, the plug/socket is also adapted for receiving distribution-associated data from the mobile device. Examples of such distribution-associated data could be data indicating desired amount of power, voltage and/or current and how these parameters should be changed over time.

In some embodiments, the plug/socket is equipped with an anchoring device adapted for anchoring the plug/socket in corresponding receiving plug/socket of a mobile device, said anchoring device being controlled by the controller in such a way that the plug/socket is anchored when power is distributed to the plug/socket.

As disclosed herein, an "anchoring device" is a device for locking a plug when inserted into a socket in order to prevent accidental removal of the plug from the socket. The anchoring device is typically some kind of locking bolt that docks into a corresponding cavity when the plug is locked into the socket. However, the anchoring device may also be designed as a ring having a protruding part docking into a corresponding cavity when the ring is turned. The anchoring device is controlled by the controller. Typically, control signals are sent to the anchoring means using the connection and said cable from the contact module.

In some embodiments, the appliance comprises an upper part having a communication unit adapted for wireless transmission of data including instructions between the controller and a server either located in the cloud or in a local master appliance, said instructions relating to distribution of power from said incoming cable between said outgoing cable and said cable connection.

As disclosed herein, the term "communication unit" relates to a combined transmitter and receiver (a "transceiver") adapted for transmitting and receiving data signals to and from the cloud (internet), either directly or via a master communication unit. In the present context, the specific master communication unit is located in a master appliance. As disclosed herein, the term "master appliance" relates to an appliance that controls and coordinates a group of electric distribution appliances based on incoming data from the individual electric distribution appliances and a set of rules that is stored in a memory of the master appliance. As already mentioned, said group of electric distribution appliances may also be controlled and/or coordinated via a cloud server.

In some embodiments, the communication unit is adapted for wireless transmission of data including instructions between the controller and an LED arrangement; said data relating to power consumption and status of said LED arrangement (said LED arrangement comprises units for wireless communication and control units in addition to the actual LED units). Accordingly, in this embodiment the controller is set up to monitor and control an LED arrangement. A typical LED arrangement is set up to forward data indicating status of the arrangement and information about a failure of a particular arrangement could be forwarded quickly. The light emission of the LED arrangement could also be controlled in this manner.

In some embodiments, the controller is adapted for receiving instructions from the communication unit and to control said switching means based upon said instruction in such a way that the power from said incoming cable is distributed between said outgoing cable and said connection.

In some embodiments, the communication unit further comprises a femtocell base station for providing mobile phone services and/or a Wi-Fi hot spot in an area within 10 m from the electric distribution appliance. A femtocell base station in accordance with the present application must have a small volume in order to be able to be enclosed within the upper part of the electric distribution appliance. The transmitted power of the base station is limited.

In some embodiments, the communication unit is set up to transfer all incoming and outgoing data from mobile phone services and/or Wi-Fi via the master appliance.

In some embodiments, the communication unit is connected to a separate antenna, which is arranged adjacent to said communication means and/or adapted for being mounted within or on a lamp post.

In some embodiments, the upper part comprises the interface section of the electric distribution appliance, said section having an identification means, such as a RFID or Bluetooth reading means. Any RFID (Radio Frequency Identification) or Bluetooth reading means having a sufficiently small size that renders it possible to arrange it in the upper part could be used in the electric distribution appliance.

In some embodiments, the upper part comprising means for displaying visual signals. The means is typically some kind of light-emitting arrangement and/or screen for showing text messages. Accordingly, the means is typically set up to display a text message and/or a light indication. Any light-emitting arrangement and/or screen fulfilling these requirements and having a suitable size fitting on the outside of the upper part could be used.

In some embodiments, said appliance may be operated in a first, second and third mode, wherein
  i) the appliance in said first mode does not have any outer actuating means, the contact module is hidden, the lid is closed and no electrical power is distributed to the cable connection and the contact module;
  ii) the appliance in said second mode does not have any outer actuating means, the lid is open, the contact module is available from outside, and electrical power is distributed to the cable connection and the contact module;
  iii) the appliance in said third mode does not distribute electrical power from the switching means, and an actuating means for carrying out service and/or maintenance work is exposed.

As disclosed herein, the term "actuating means" relates to any means for controlling the electrical distribution appliance. Typical examples of such means are a button, an electrical receptacle or an electrical plug.

In some embodiments, the operation mode is changed by presenting an RFID tag and/or a Bluetooth communication means to the interface section, calling or sending an SMS from a specific mobile phone to a specific number or a combination of these actions. When changing operation mode by calling or sending an SMS from a specific mobile phone to a specific number, the call or SMS is received by the femtocell base station of the communication unit of the electric distribution appliance. The controller is set up to check whether the mobile phone number from which the call or SMS was sent is registered and information about the number is forwarded to the master appliance with which the appliance is associated. In case the number is registered, the master appliance is set up to send instructions to the electric distribution appliance that operation mode may be changed.

In some embodiments, said actuating means for carrying out service and/or maintenance work is hidden behind a sliding outer coverage comprising an aperture and controlled by a means for controlling the position of said siding outer coverage, in such a way that the sliding outer coverage is locked in a position covering said actuating means in said first and second modes and that the sliding outer coverage can be slided in a position such that said actuating means is accessible through said aperture. Typically, such an hidden actuating means could be a button or an electrical receptacle.

BRIEF DESCRIPTION OF THE FIGURES

The present invention will now be described with reference to the enclosed figures in which.

DETAILED DESCRIPTION OF THE SUBJECT MATTER PRESENTED IN THE FIGURES

Figure 1:
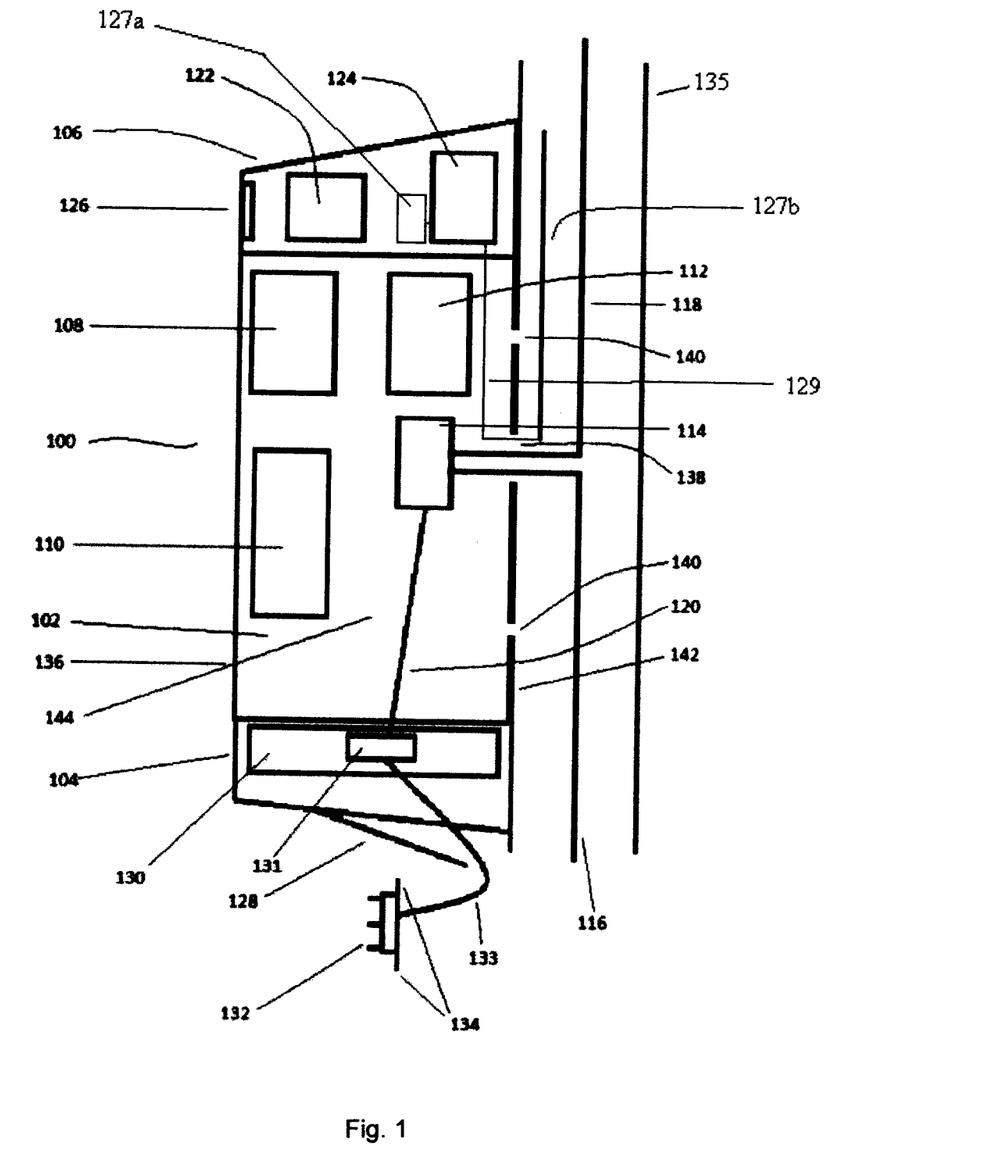
FIG. 1 discloses a side view of an electrical distribution appliance in accordance with some embodiments of the present invention, said distribution appliance being mounted on a lamp post.

FIG. 1 discloses an electrical distribution appliance 100 in accordance with the present invention, said appliance being suitable for charging an electric vehicle or for temporarily distributing power to other movable power-consuming devices. In the embodiment shown in FIG. 1, the charging appliance is mounted on a lamp post 135. The charging appliance is typically comprised of three parts, namely a central part 102, a lower part 104 and an upper part 106.

Figure 2A:
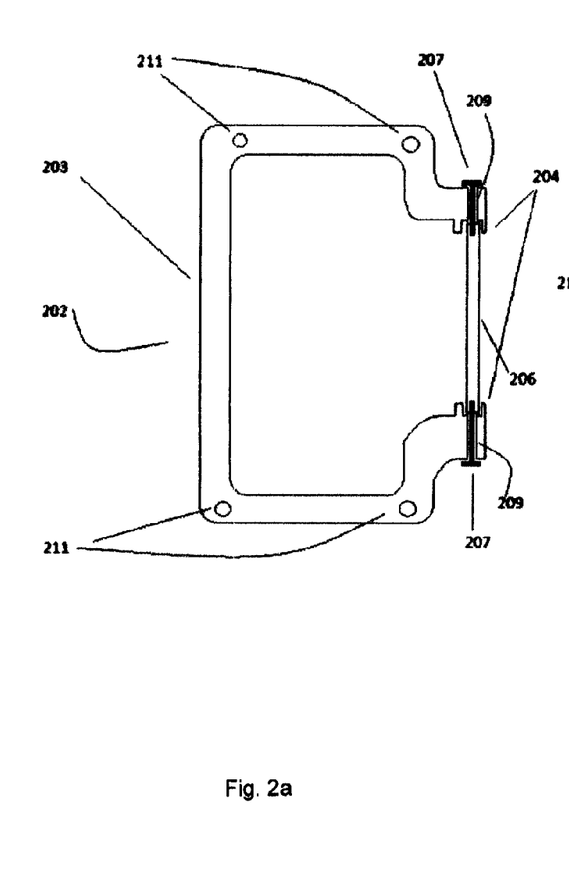
FIG. 2a is a top view of an outer covering of the central part and how the upper and lower parts are joined to the central part, in accordance with one embodiment.

FIGS. 2a-2e show how the covering 202 of the central part 102 is constructed according to various embodiments of the present invention. FIGS. 2a-2e also reveal examples of how to join the lower part 104, 214 and the upper part 106, 212 to the central part. According to this embodiment and as shown in FIG. 2a in a view from above, the covering 202 of the central part is made up by an U-shaped member 203 and a back part 206. There are means 204 for joining the back part 206 to the two edges of the U-shaped member 203. Typically, these means 204 are grooves into which the back part is slided. In some embodiments, there are holes 209 between the bottom of grooves 204 and the outer surface of the U-shaped member 203 in order to fix the back part 206 in the grooves 204 using fastening means 207. Furthermore, there are cavities 211 in the upper edge of the U-shaped member 203 and corresponding cavities on the lower edge (not shown) for receiving fastening means for securing the upper part 106, 212 and the lower part 104, 214, respectively. An additional embodiment of the outer surface of a supporting side 144 of the U-shaped member 203 will be described in FIG. 6 below.

Figure 2B:
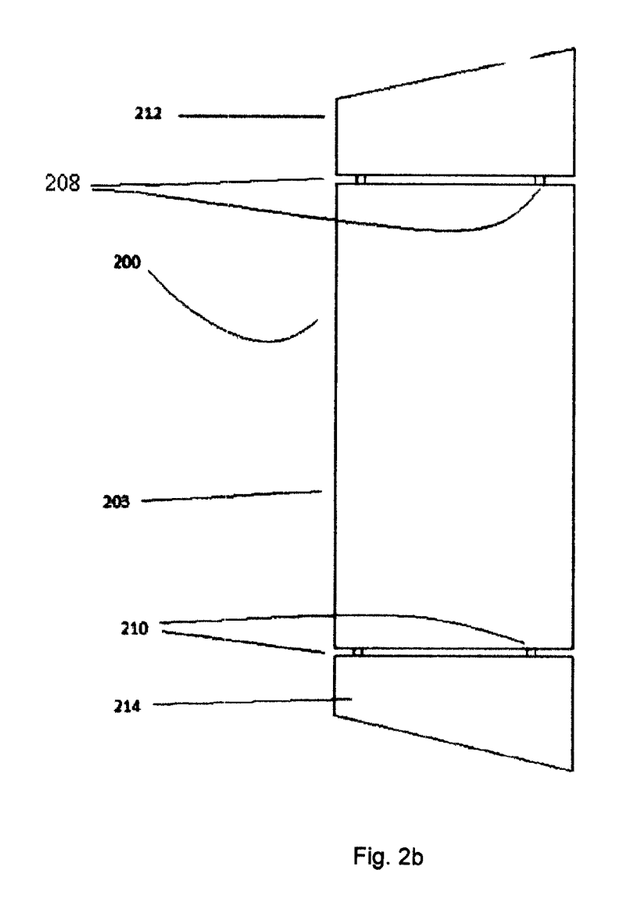
FIG. 2b is a side view of the covering and shows how the lower and upper parts are joined by fastening means to the U-shaped member of the covering, in accordance with one embodiment.
Figure 2C:
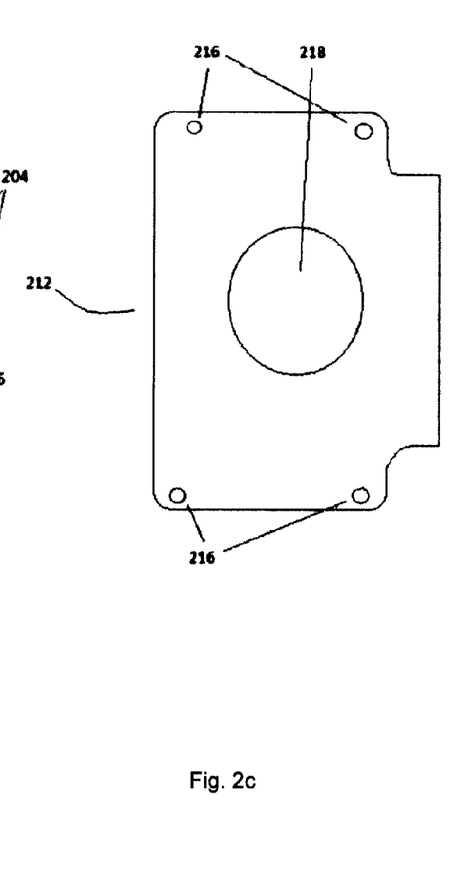
FIG. 2c is a bottom view showing how the upper part is connected to an upper edge of the U-shaped member of the covering, in accordance with one embodiment.
Figure 2D:
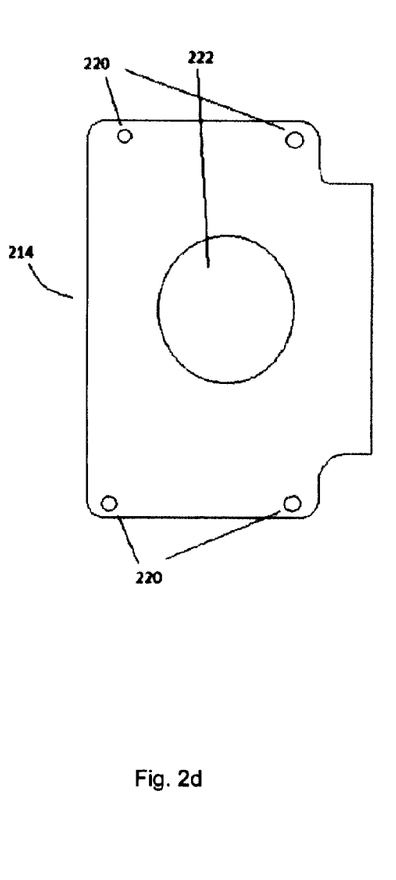
FIG. 2d is a top view of the lower part showing how the lower part is connected to a lower edge of the U-shaped member of the covering, in accordance with one embodiment.

FIG. 2b is a side view of the covering which briefly outlines how the lower part 214 and upper part 212 are joined by fastening means 208, 210 to U-shaped member 203. FIG. 2c is a view from below of the upper part 212 showing how it is connected to the upper edge of the U-shaped member 203. There are cavities 216 for receiving fastening means 208. There is also a larger opening 218 for receiving cable connections from the central part 102. Similarly, FIG. 2d is a view from above of the lower part 104, 214, showing how it is connected to the lower edge of the U-shaped member 203. There are cavities 220 for receiving fastening means 210. There is also a larger opening 222 for receiving cable connections from the central part 102. Accordingly, in the shown embodiment both the lower part 104, 214 and the upper part 106, 212 can be disconnected from the central part 102. This is advantageous because it provides flexibility. New functions may easily be installed by simply replace existing upper and/or lower parts with new parts.

Figure 2E:
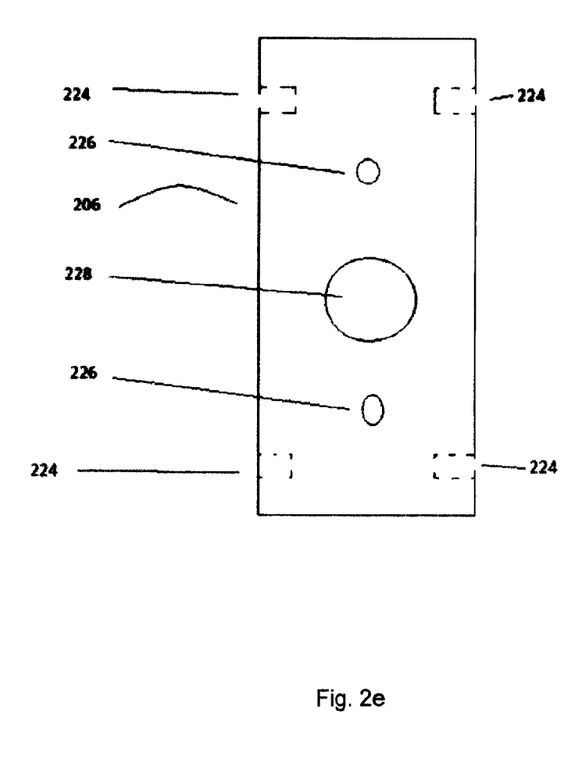
FIG. 2e shows a back part, in accordance with one embodiment.

FIG. 2e discloses a back part 206. The back part typically comprises openings 226 intented for receiving fastening means. It also comprises a cable entrance 228, 138. The openings 226 are intended to be used when fastening the electrical distribution appliance 100 to an existing lamp post. The cable entrance is intended to receive an incoming electrical cable from the power mains and an outgoing cable (not shown). Furthermore, the back part comprises cavities 224 for receiving fastening means 207.

Referring once again to the embodiment shown in FIG. 1, the central part comprises a front side 136, two supporting sides 144 opposite each other and a rear side 142. The front side 136 and the two supporting sides 144 are part of the U-shaped member 203. The rear side 142 is mostly made up of back part 206. In the shown embodiment, the rear side 142 is adapted for being mounted on a lamp post 135. The rear side further has a cable entrance 138 and at least one further opening 140 for receiving a fastening means for joining the central unit to a lamp post 135. The central part 102 may comprise a payment section 108 and it may comprise an interface section 110 that are located on an outer surface 136 of the central part 102. The payment section 108 comprises means for obtaining payment for the electrical power distributed by the charging appliance to an electric vehicle. Typically such means may include a credit card reader and an interface relating to such a reader (not shown in FIG. 1). The interface section 110 typically comprises means for initiating and terminating charging of the electrical vehicle (not shown in FIG. 1), or, in one embodiment, control anchoring of the power connection to the mobile device such as an electric vehicle. Furthermore, the central part 102 comprises a controller 112 and a switching means 114. The payment section 108 and the interface section 110 if present in the central part are both connected to the controller 112. In case the central part comprises a payment section 108 and/or an interface section 110, the controller receives data from the payment section 108 and/or interface section 110 indicating payment or invoicing data. In some embodiments, the controller may also receive data from the interface section 110 regarding desired distribution of power to a mobile device. In response to this data the controller typically sends signals to the switching means 114 indicating that power is to be distributed to the lower part 104. The switching means 114 is controlled by the controller 112 and furthermore connected to an incoming electrical cable 116 in the lamp post which in turn is connected to the power mains. Based on signals from the controller 112, the switching means 114 allocates the amount of power that is available for distribution in cable 120 leading to lower part 104 and the amount that is distributed through cable 118, typically for lightening purposes (No lightening means is shown in FIG. 1). Both incoming cable 116 and cable 118 go through cable entrance 138. The allocation of power is controlled by controller 112 based on, for example, requirements of lightening and power limits and incoming data from optional power sensor means (not shown). The controller 112 is typically controlled by a master processor 402 (not shown in FIG. 1) in a master appliance (318, 400). In one embodiment, the controller 112 is connected to the processor through signals transmitted over the power mains. In another embodiment, the controller 112 is connected to the processor via wireless communication unit 124 in the upper part 106.

Lower part 104 is the part of the electrical distribution appliance 100 that is adapted for distributing power to a movable device such as an electric vehicle, car heater or engine preheater. As already mentioned, power is transferred by cable 120 from the switching means 114 to the lower part 104. More specifically, cable 120 distributes the power to a contact module 130 which in turn distributes the power to the movable device. In the embodiment shown in FIG. 1, the lower part 104 also comprises a closable lid 128 under which the contact module 130 is located. In the embodiment shown, the contact module comprises a connection 131 where power from cable connection 120 is transferred to a plug/socket 132 which is adapted for being connected to a movable device. In one embodiment, the power is lead from the connection 131 further through an optional external cable 133 to said plug/socket. Preferably, said plug/socket 132 has an anchoring device 134 adapted for gripping into a corresponding part of a plug/socket of a movable device. The anchoring device 134 is controlled by the controller 112. Typically, a user may initiate and terminate anchoring using the anchoring device 134 by entering a command on the interface section 110, 122. An advantage of this embodiment is that the risk for accidental interruption of the power supply is minimized. In some embodiments, the plug/socket 132 may comprise a contact for receiving data regarding desired power conditions for the mobile device. In these embodiments, this data is forwarded to controller 112, for instance by, among all cable 133 and cable connection 120. As is already mentioned, lower part 104 can easily be removed, for instance when multiple plug/socket standards are to be used.

Upper part 106 of the embodiment shown in FIG. 1 comprises a communication unit 124, and optionally a means 126 for displaying visual signals. In some embodiments, the interface section 122 is located in upper part 106 instead of in the central part 102. Irrespective of whether the appliance 100 has an interface section located in the central part 102 or the upper part 106, the interface section may comprise an identification means, such as a RFID and/or a bluetooth reading means. The RFID and/or bluetooth reading means enables a user to identify himself by bringing an RFID tag or an e-wallet (typically a mobile phone comprising bluetooth functionality) close to the reading means 122. Such an identification is advantageous for several reasons. In one embodiment a user would not be required to insert any credit card into the card reader of the payment section 108. In some embodiments there is no such payment section. In this embodiment the information in an RFID tag is sufficient to invoice the user for distributed power. In one embodiment, the user may reserve a particular electrical distribution appliance and indicate his RFID tag or credit card as identification means. When a particular electrical distribution appliance has been reserved according to this embodiment, the appliance is locked and it is not possible to obtain any power from plug/socket 132. In a preferred embodiment, a visual signal is displayed by a means 126 for displaying visual signals. Typically, such signals could be flashing lamps and/or screens displaying text messages, or the like. Preferably, the plug/socket is hidden behind lid 128. The user unlocks the appliance by presenting his RFID tag, bluetooth-containing device (mobile phone), or credit card to relevant parts of the appliance 100, or by calling or sending an SMS to a specific phone number or a combination of two or more of these actions.

The communication unit 124 of the upper part 106 is a wireless communication device comprises a receiver and transmitter for receiving and transmitting information and commands. In one embodiment, the communication unit is set up to exclusively communicate with a single master communication unit 408 in the a master appliance 318, 400 which in turn is set up for communication with a cloud server. In another embodiment, the communication unit 124 is set up to directly communicate with such a server (cloud server) via a wireless network such as a mobile phone network connected to the internet without going through any master appliance. In one embodiment, the communication unit 124 is also adapted for wireless communication with an LED arrangement. Examples of information and commands that could be transmitted/received by the communication unit 124 is invoice information, user information, information regarding power consumption in the network mains, commands regarding the light production in an external light-producing means of a lamp post 135 and possibly status (such as failure or proper functioning) of an LED arrangement used as such a light-producing means. The information and commands are forwarded to the controller which in turn is set up to use this information when controlling the switching means 114. In one embodiment, the communication unit further comprises a small femtocell base station for providing mobile phone services and/or a Wi-Fi hot spot in an area within 10 m from the electrical distribution appliance 100. In this embodiment, the data traffic to and from the small femtocell base station is guided via the the master communication unit 408 of the master appliance 318, 400. In one embodiment, the communication unit 124 may also be connected to a separate antenna 127a, 127b. In one embodiment, the antenna 127a is located in the upper part 106 adjacent to the communication unit 124. In this embodiment, the antenna is typically of a type used in mobile phones. In one embodiment, the antenna protrudes through the outer covering of the upper part 106. In another embodiment, the antenna is not protruding at all but is fully enclosed within the outer covering of the upper part 106. These embodiments are particularly useful for lamp posts made by metal and where distances are small between a particular electric distribution appliance 100 and the master appliance 318, 400 controlling said electric distribution appliance. In another embodiment, the antenna 127b is adapted for being mounted at a distance from said communication unit 124. A cable 129 connects the antenna 127b and the communication unit 124. In one embodiment, the antenna could be adapted for being mounted on the outer surface of a lamp post 135. In this embodiment (not shown) the cable is arranged through the outer covering of the upper part 106. In another embodiment, the antenna 127b is adapted for being mounted in a cavity inside a lamp post 135. A lamp post suitable for this embodiment is typically made of a polymeric material such as fibreglass in order ensure good conditions for the antenna 127b. In this embodiment, the cable 129 connecting the antenna 127b with the communication unit 124 is arranged through opening 218 into the central part 102 and out through cable entrance 138 and into the lamp post 135. The embodiments having an antenna that is adapted for being mounted at a distance from the communication unit are advantageous when the electric distribution appliance 100 is to be mounted at a location which is more distant from the master appliance 318, 400.

Figure 3:
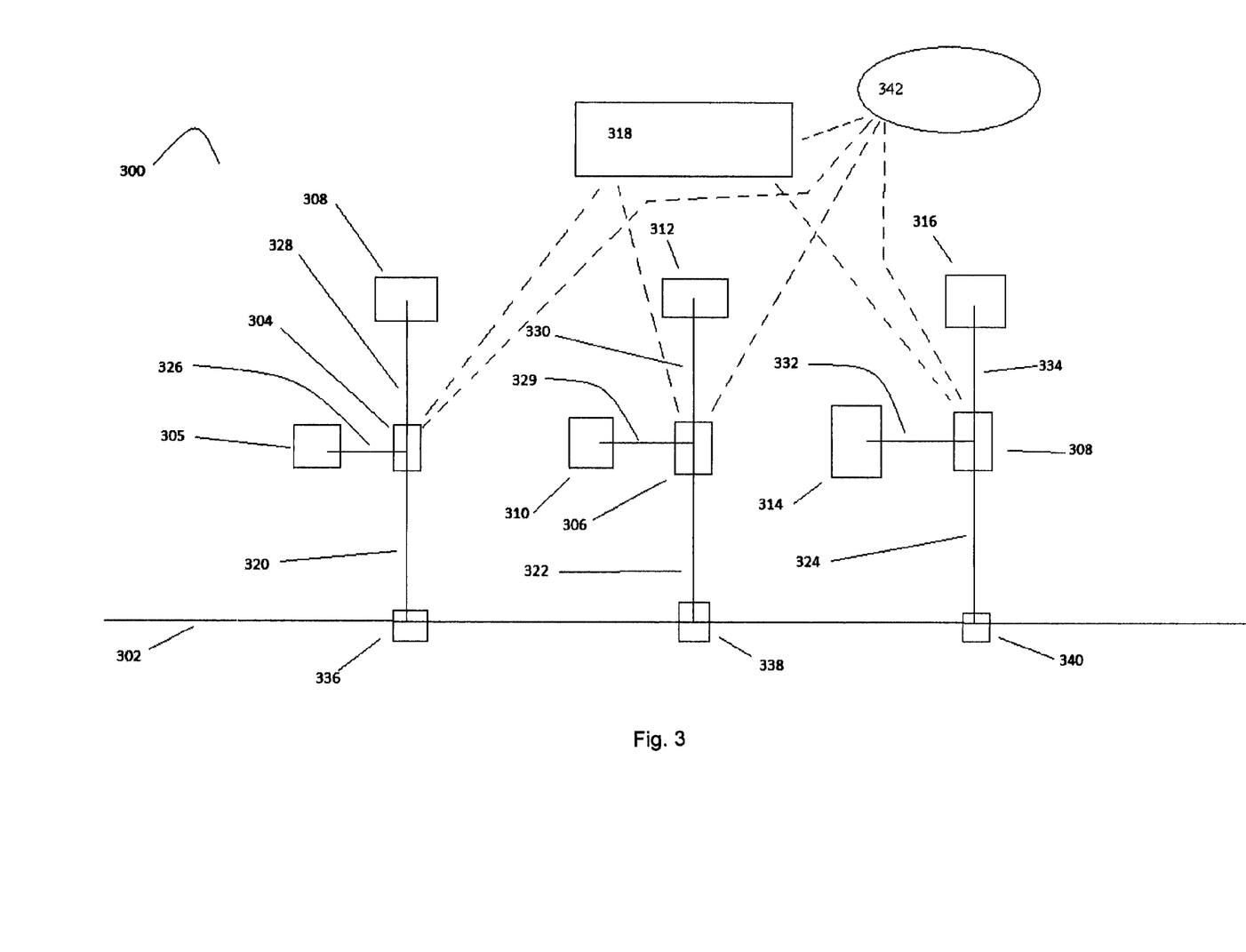
FIG. 3 outlines a system comprising several electrical distribution appliances distributed on lamp posts along a road, where the system is controlled by a master appliance and/or a cloud server.

FIG. 3 discloses an overview of a system 300 comprising a plurality of electric distribution appliances 304, 306, 308 coordinated and controlled by a master appliance 318. Each appliance is mounted on a lamp post. Each lamp post is connected in parallel to a feeder cable 302 from the mains. FIG. 3 discloses three connection points 336, 338, 340 from which incoming electrical cables 320, 322, 324 distribute power to electric distribution appliances 304, 306, 308. A part of the power that reaches the electric distribution appliances may be distributed to lightening means 308, 312, 316 through cables 328, 330 and 334. The remaining part of the power may be distributed to customers wanting power for a mobile device 305, 310, 314 through cables 326, 329 and 332.

This distribution is controlled by a server connected to the internet 342, either directly via a mobile phone network, or via a master appliance 318 which in turn is connected to a mobile phone network and the internet 342. The distribution control is based on a plurality of considerations and rules. Firstly, there is maximum value regarding the power that could be distributed by the feeder cable 302. That maximum value is dependent on physical limitations within the mains network. Secondly, a certain proportion of the power must be used for producing light, especially during dark hours at night. Thirdly, the power requirement of the different mobile devices may vary considerably. Fourthly, some clients may have been assigned a higher priority rank within the system and may hence be entitled to a larger proportion of the available power. Rules based price variations over time may also be applicable. In one embodiment master appliance 318 controls the distribution based on at least some of the above mentioned rules and information sent by the electric distribution appliances 304, 306, 308. In some embodiments, the communication between the electric distribution appliances 304, 306, 308 and the server connected to the internet 342 optionally via the master appliance 318 is carried out by transmitting signal using mobile phone technology, such as GSM, 3G or 4G. In some embodiments, the communication between the electric distribution appliances 304, 306, 308 and master appliance 318 is carried out by using WiFi technology. If present, the master appliance 318 is further connected with the internet 342 using mobile phone technology, such as GSM, 3G or 4G. Obviously, data traffic from and to the base stations of the electric distribution appliances may be sent through the master appliance to/from the internet 342 or directly to/from the internet 342. However, the internet connection is used for other purposes as well. The control system of the master appliance can be updated by downloading data from the internet 342. Identification of clients can be done by sending client-identifying data such as data from credit cards, bluetooth-containing devices or RFID tags to an external unit also connected to the internet and receiving further instructions from that external unit. Billing may also be carried out by transferring data identifying the client as well as data regarding the amount of electrical energy that has been distributed to the client to an external unit also connected to the internet followed by central invoicing. In some embodiments, it is also possible send commands to a particular electric distribution appliance of the group 304, 306, 308 by calling or sending an SMS to a specific telephone number from a mobile telephone having a SIM card registred by the system 300. Typically, the system 300 is set up to interprete a first such call or SMS as an inducing command and a subsequent second such call or SMS as a terminating command. In some embodiments, the combination of a call/SMS and presentation of an RFID tag is regarded as such commands. The system may register the SIM card as a card relating to a regular user requesting distribution of electrical power. Alternatively, the system may register the SIM card as relating to maintenance and service staff. In that latter case the inducing command results in that the electric distribution appliance is rendered available for mainenance and service activities.

Figure 4:
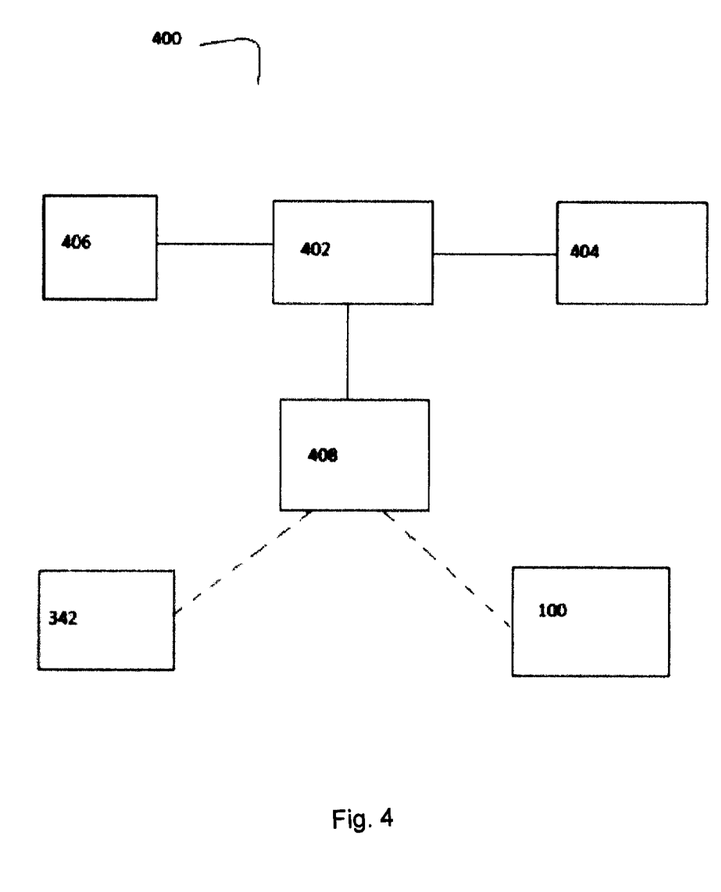
FIG. 4 schematically discloses a master appliance adapted for controlling a group of electrical distribution appliances optionally based on input from a cloud server.

FIG. 4 shows a simplified scheme of a master appliance 400 which in some embodiments may be used for controlling a group of electrical distribution appliances. The master appliance is comprised of a processor 402, a memory means 404, a connection to a power supply network 406, and a master communication unit 408. The master communication unit is adapted for receiving and transmitting data from/to individual electric distribution appliances 100 of a group of such appliances. The master communication unit is also adapted for connecting the master appliance 400 to a mobile telecommunication network such as a GSM, 3G or 4G network in order to establish contact over the internet with a cloud server which controls the master appliance (if present) as well as the group of electrical distribution appliances 100. A memory means 404 may be set up for storing rules for controlling a group of electric distribution appliances 100. The processor 402 is set up for receiving data originating from a specific electric distribution appliance of said group from the master communication unit 408 and, in some embodiments forward said data to said controlling cloud server. The processor is then set up to process said data using input from rules stored in the optional memory means 404 and, in some embodiments, from said controlling cloud server connected to the internet. Subsequently, the processor 402 is set up to sent instruction data to said specific electric distribution appliance 100 of said group.

As is shown in FIG. 3, the group of electrical distribution appliances may also be controlled directly by a cloud server using communication over the internet and a mobile phone network directly between the server and a communication unit of an electrical distribution appliance. Information from a particular electric distribution appliance is forwarded to said cloud server and controll signals are sent back to said electric distribution appliance based on said information and rules stored in said server.

Figure 5:
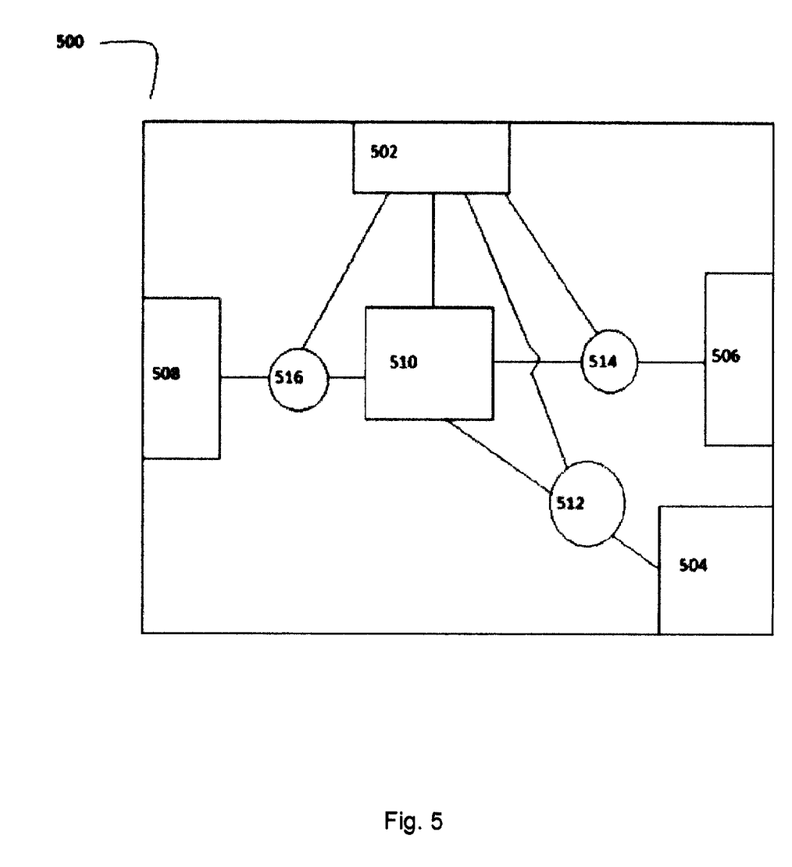
FIG. 5 briefly outlines a switching means of an electrical distribution appliance in accordance with an embodiment of the present application.

FIG. 5 discloses a simplified scheme of a switching means 114, 500. The swiching means 500 comprises some different connection means 502, 504, 506, and 508, a switch 510 and some power sensors 512, 514 and 516. Connection means 502 is adapted for being connected to a cable from the controller 112. Signals from and to the controller 112 are forwarded from connction means 502 to and from the switch 510 and at least one power sensor 512, 514 and 516. Connection means 504 is adapted for being connected to incoming cable 116. Connection means 506 is adapted for being connected to outgoing cable 118. Connection means 508 is adapted for being connected to cable connection 120. Each connection means 504, 506, 508 is connected to the switch 510. There may be a power sensor 512, 514, 516 arranged along the cables between each connection means and the switch.

Figure 6:
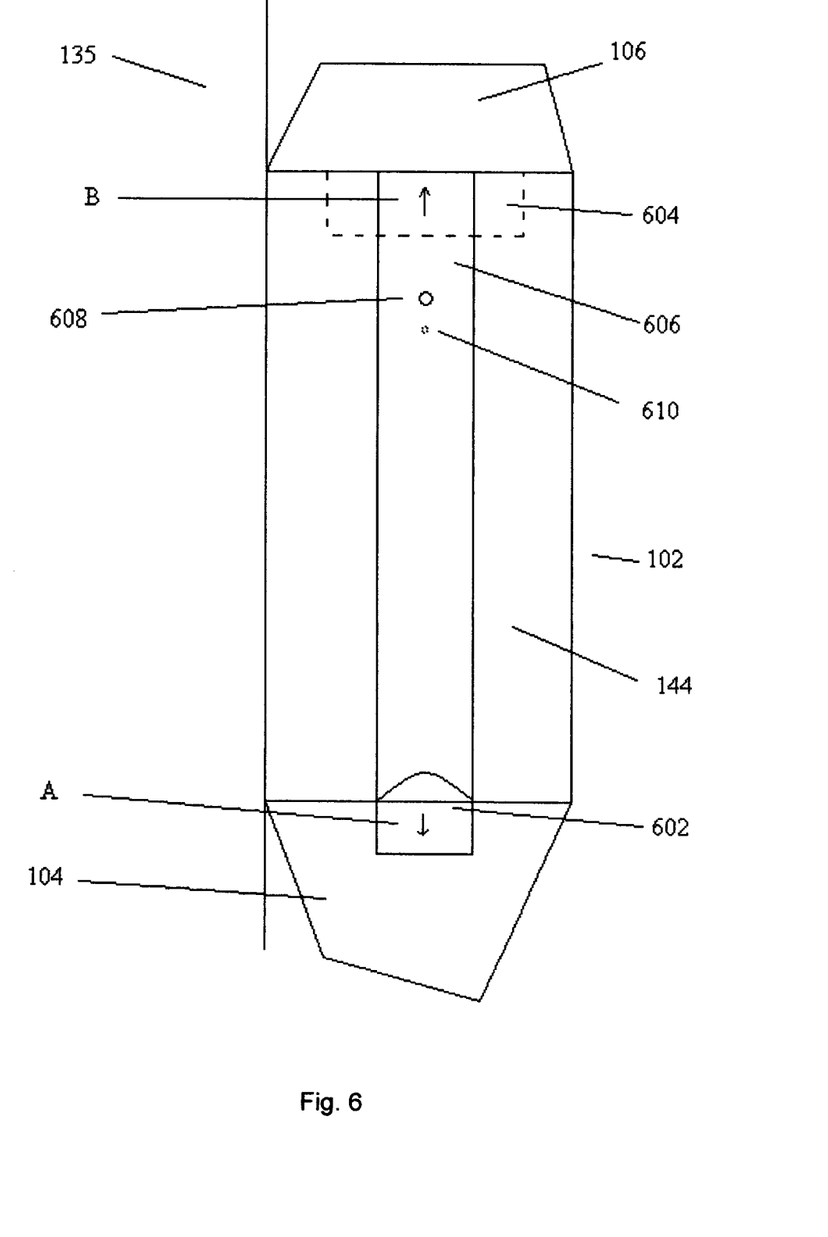
FIG. 6 outlines how an electrical distribution appliance could be rendered accessible for service and mainenance work in accordance with some embodiments.

FIG. 6 outlines how an electrical distribution appliance 100 could be rendered accessible for service and mainenance work in accordance with some embodiments. The electrical distribution appliance embodiment 100 shown in FIG. 6 does not have any outer actuating means in order to protect it from vandalism. Accordingly, FIG. 6 shows a supporting side 144 of an electrical distribution appliance 100 comprising a central part 102, a lower part 104 and an upper part 106 mounted on a lamp post 135. There is a sliding outer coverage 606 which may be locked in the shown position by a position-controlling locking means 604. Suitable such means 604 are any locking means that could be controlled electronically. The skilled person knows how to select suitable such means. When the position-controlling locking means 604 is unlocked, it is possible to move the sliding outer coverage 606 in the direction marked "A" by pulling tab 602 until hidden actuating means 610 (such as a button or an electric receptacle) is accessable through aperture 608. In this accessable state, it is possible to carry out maintenance work. The appliance 100 could be closed by pushing coverage 606 in the direction marked "B". In order to open the locking means 604, it is possible send commands to the particular electric distribution appliance 100 by calling or sending an SMS to a specific telephone number from a mobile telephone having a SIM card registred for service and maintenance activities by a system 300 as outlined in FIG. 3. Typically, the system 300 is set up to interprete a first such call or SMS as an inducing command and a subsequent second such call or SMS as a terminating command. In some embodiments, the combination of a call/SMS and presentation of an RFID tag is regarded as such commands.

The embodiments disclosed in the detailed description are only examples of preferred embodiments and are not intended to restrict the scope of the present invention. The scope of the invention is only defined by the claims.

The invention claimed is:

1. An electric distribution appliance (100) for distributing electric power to a mobile device, said electric distribution appliance (100) being adapted for being fitted to an existing lamp post (135), comprising:
a central part (102) and one or more additional parts (104, 106, 212, 214) which additional parts are mounted in such a way that they can be removed from said central part (102) while the central part (102) is mounted to a lamp post (135), and that only said central part (102) is adapted for being fitted to an existing lamp post (135), said electric distribution appliance having an interface section (110, 122); and said central part (102) having
a switching means (114, 500);
a cable connection (120); and
a controller (112),
said switching means (114, 500) being connected to said connection (120) and being adapted for being connected to an incoming cable (116) in connection with a power supply network and being adapted for being connected to an outgoing cable (118);
said cable connection (120) being adapted for being connected to contact module (130), which in turn is adapted for distributing power to said mobile device;
said interface section (110, 122) being adapted for receiving commands from a user regarding initiation and/or termination of distribution of power into said cable connection (120), and being set up to forward data corresponding to said commands to said controller (112);
said controller (112) being set up to receive data from said interface section (110, 122);
wherein:
said switching means (114) is set up to control distribution of power from said incoming cable (116) into each of said outgoing cable (118) and said cable connection (120) based on control signals from said controller (112), and that said controller (112) is set up to control distribution of power from said incoming cable (116) into each of said outgoing cable (118) and said cable connection (120) based on external control signals, said external control signals being determined based on prestored data and incoming data from one or more of: said interface section (110, 122), an external server and said mobile device,
said electric distribution appliance is configured to be operated in a first, second and third mode, wherein
i) the appliance (100) in said first mode does not have any outer actuating means, the contact module (130) is hidden, the lid (128) is closed and no electrical power is distributed to the cable connection (120) and the contact module;
ii) the appliance (100) in said second mode does not have any outer actuating means, the lid (128) is open, the contact module is available from outside, and electrical power is distributed to the cable connection (120) and the contact module (130);
iii) the appliance (100) in said third mode does not distribute electrical power from the switching means, and actuating means (610) for carrying out service and/or maintenance work is exposed from behind a sliding outer coverage (606) comprising an aperture (608) and controlled by a means (604) for controlling the position of said siding outer coverage (606), in such a way that the sliding outer coverage (606) is locked in a position covering said actuating means (610) in said first and second modes and that the sliding outer coverage (606) can be slided in a position such that said actuating means (610) is accessible through said aperture (608); and
said operation mode is changed by presenting an Radio Frequency Identification (RFID) tag and/or a Bluetooth communication means to the interface section (110, 122), calling or sending a Short Message Service (SMS) message from a specific mobile phone to a specific number or a combination of these actions.

2. An electric distribution appliance (100) according to claim 1, wherein the switching means (114, 500) comprises at least one power sensor (512, 514, 516), said means being set up to forward power data to said controller (112).

3. An electric distribution appliance (100) according to claim 1, wherein said central part (102) further comprises a payment section (108) said payment section (108) comprising means for obtaining payment from a customer, said payment section being set up to send data relating to payment to said controller (112).

4. An electric distribution appliance (100) according to claim 1, wherein the appliance also comprises a lower additional part (104), said lower part (104) comprising a contact module (130) adapted for distributing power to a mobile device, said contact module (130) being connected to cable connection (120).

5. An electric distribution appliance (100) according to claim 4, wherein the lower part (104) comprises a closable lid (128) covering the contact module (130), and where the lid (128) is automatically opened before distribution of power through the contact module (130) is initiated and where the lid (128) is closed when distribution of power has been terminated.

6. An electric distribution appliance (100) according to claim 4, wherein the power is distributed to a connection (131) in said contact module (131) and further through cable (133) to a plug/socket (132) adapted for being connected to mobile device, and wherein there is a connection enabling data transfer between the mobile device and the controller (112).

7. An electric distribution appliance (100) according to claim 6, wherein the plug/socket (132) is equipped with an anchoring device (134) adapted for anchoring the plug/socket (132) in corresponding receiving plug/socket of a mobile device, said anchoring device (134) being controlled by the controller (112) in such a way that the plug/socket (132) is anchored when power is distributed to the plug/socket (132).

8. An electric distribution appliance (100) according to claim 1, wherein the appliance comprises an upper part (106) having a communication unit (124) adapted for wireless transmission of data including instructions between the controller (112) and a cloud server, optionally via a master appliance (318, 400), said instructions relating to distribution of power from said incoming cable (116) between said outgoing cable (118)and said cable connection (120).

9. An electric distribution appliance (100) according to claim 8, wherein the communication unit (124) is adapted for wireless transmission of data including instructions between the controller (112) and an Light Emitting Diode (LED) arrangement, said data relating to power consumption and status of said LED arrangement.

10. An electric distribution appliance (100) according to claim 8, wherein the controller (112) is adapted for receiving instructions from the communication unit (124) and to control said switching means (114) based upon said instruction in such a way that the power from said incoming cable (116) is distributed between said outgoing cable (118) and said cable connection (120).

11. An electric distribution appliance (100) according to claim 8, wherein the communication unit (124) further comprises a small femtocell base station for providing mobile phone services and/or a Wi-Fi hot spot in an area within 10 m from the electric distribution appliance (100).

12. An electric distribution appliance (100) according to claim 11, wherein the communication unit (124) is set up to transfer all incoming and outgoing data from mobile phone services and Wi-Fi via the master appliance (318, 400).

13. An electric distribution appliance (100) according to claim 8, wherein the communication unit (124) is connected to a separate antenna (127a, 127b) which is arranged adjacent to said communication means (124) and/or adapted for being mounted within or on a lamp post (135).

14. An electric distribution appliance (100) according to claim 8, wherein the upper part (106) comprises an interface section (110, 122) having identification means, including one or more of: a Radio Frequency Identification (RFID) reading means and a Bluetooth communication means.

15. An electric distribution appliance (100) according to claim 8, wherein the upper part (106) comprising means (126) for displaying visual signals.

16. An electric distribution appliance (100) according to claim 15, wherein the means (126) for displaying visual signals is set up to display a text message and/or a light indication.

* * * * *